United States Patent
Longmoore

(10) Patent No.: US 7,175,906 B2
(45) Date of Patent: *Feb. 13, 2007

(54) COLD SEAL RELEASE FILM WITH IMPROVED SCUFF RESISTANCE

(75) Inventor: Kenneth J. Longmoore, Newark, DE (US)

(73) Assignee: Applied Extrusion Technologies, Inc., New Castle, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/145,611

(22) Filed: Jun. 6, 2005

(65) Prior Publication Data

US 2005/0227103 A1 Oct. 13, 2005

Related U.S. Application Data

(60) Continuation of application No. 10/845,828, filed on May 14, 2004, now Pat. No. 6,919,129, and a division of application No. 10/141,258, filed on May 8, 2002, now abandoned.

(51) Int. Cl.
*B32B 7/10* (2006.01)
*B32B 27/32* (2006.01)

(52) U.S. Cl. ............ 428/354; 428/343; 428/516; 428/523; 524/394

(58) Field of Classification Search ............ 428/343, 428/354, 500, 516, 523; 524/394
See application file for complete search history.

(56) References Cited

U.S. PATENT DOCUMENTS

| 4,354,004 A | 10/1982 | Hughes et al. |
| 4,554,321 A | 11/1985 | Hwo et al. |
| 5,489,473 A | 2/1996 | Wilkie |
| 5,792,549 A | 8/1998 | Wilkie |
| 5,798,174 A | 8/1998 | Wilkie |
| 5,837,177 A | 11/1998 | DiNardo et al. |
| 5,981,047 A | 11/1999 | Wilkie |
| 5,998,039 A | 12/1999 | Tanizaki et al. |
| 6,171,681 B1 * | 1/2001 | Mascarenhas et al. ...... 428/141 |

FOREIGN PATENT DOCUMENTS

| EP | 0331410 | 9/1989 |
| GB | 1029049 | 5/1966 |
| WO | WO 00/32395 A1 | 6/2000 |

OTHER PUBLICATIONS

International Search Report mailed Jul. 9, 2003.

* cited by examiner

*Primary Examiner*—D. S. Nakarani
(74) *Attorney, Agent, or Firm*—Caesar, Rivise, Bernstein, Cohen & Pokotilow, Ltd.

(57) ABSTRACT

A cold seal release film in the form of a monolayer film or an outer layer of a multilayer film. The cold seal release film includes a nucleating agent and 10%–100% by weight of the polymer composition of a polymer selected from the group consisting of 1-butene homopolymer, 1-butene/ethylene random copolymers having over 50% by weight 1-butene therein blends of the 1-butene homopolymer and the 1-butene/ethylene random copolymers, and 90%–0% by weight of the polymer composition of a polymer selected from the group consisting of ethylene random copolymers of polypropylene, butene random copolymers of polypropylene and ethylene-butene random terpolymers of polypropylene.

7 Claims, No Drawings

COLD SEAL RELEASE FILM WITH IMPROVED SCUFF RESISTANCE

RELATED APPLICATIONS

This application is a continuation of U.S. application Ser. No. 10/845,828 filed on May 14, 2004 now U.S. Pat. No. 6,919,129, titled COLD SEAL RELEASE FILM WITH IMPROVED SCUFF RESISTANCE, which, in turn, is a divisional of U.S. application Ser. No. 10/141,258 filed on May 8, 2002, and titled COLD SEAL RELEASE FILM WITH IMPROVED SCUFF RESISTANCE, now abandoned.

BACKGROUND OF THE INVENTION

This invention relates generally to cold seal release films, and more particularly to packaging structures employing. Cold seal release films having improved scuff resistance.

Cold seal release films are most commonly used as the outside web or film of a multi-web packaging structure. In common practice, the release film is a clear web that is reverse printed and adhesive laminated to an inner web such as an opaque film (in a candy bar wrap) or a metallized film (in a breakfast bar wrap). After the two films are laminated a layer of cold seal adhesive is applied to the inner web as the web is wound into a roll. The cold seal release film serves the following functions: 1) it provides a transparent web which can be reverse printed so that the decoration is "buried" beneath the clear web to prevent the ink from being worn away; 2) it provides the desired slip properties so that the laminate will run effectively on packaging machines and 3) it provides a surface with low adhesion to the cold seal adhesive so that the laminate roll can be unwound during a packaging operation, with the adhesive remaining on the desired surface of the lamination.

The most successful prior art cold seal release film in the market place today employs a polypropylene homopolymer as the cold seal release surface. This prior art film provides good printing characteristics, low coefficient of friction (COF) and a reasonably low adhesive release force from the most common cold seal adhesives; namely, acrylic/rubber latex adhesives. Moreover, prior art cold release films employing a polypropylene homopolymer also have reasonably good scuff resistance. However, the prior art films employing polypropylene homopolymer have a major deficiency; namely, they do not provide the desired low adhesive release force from synthetic adhesives, e.g., ethylene vinyl acetate based adhesives.

Other polymer films containing 1-butene homopolymer, 1-butene/ethylene copolymers (collectively referred to as polybutenes) and 1-butene copolymers blended with ethylene and/or butene random polypropylene copolymers yield low adhesive release force from both synthetic adhesives and acrylic/rubber latex adhesives. However, these prior art films do not have desired scuff resistance properties. Representative patents disclosing these latter polymer compositions for cold release films are U.S. Pat. Nos. 5,981,047; 5,798,174; 5,489,473 and 5,792,549, which are all incorporated herein by reference.

As noted above, an important characteristic for cold seal release films is good scuff resistance. This is an important property because the film serves as the outside web or layer in a monolayer or multilayer cold seal packaging application. Therefore, scuffing, which can occur either during the printing/laminating process or the packaging process, causes the finished product to have a dull or shop-worn appearance, which is undesirable.

The following additional patents also disclose films employing butene polymers:

U.S. Pat. No. 4,554,321 to Hwo et al. discloses heat sealable films having improved seal impact strength comprising a stereoregular, elastomeric polymer of butene-1 or blends thereof with conventional butene-1-ethylene copolymers, optionally with small amounts of polypropylene and/or crystallization nucleating agents. The use of such stereoregular, elastomeric polymers is not desirable for use in cold seal release films of this invention.

U.S. Pat. No. 5,998,039 to Tanizaki, et al. discloses a polypropylene composite film comprising (1) a crystalline polypropylene layer and (2) a layer formed from a blend of a polypropylene homopolymer (5–95%) and a propylene 1-butene random copolymer (95–5%), wherein the propylene component is greater than 50%, by weight, of the copolymer composition.

WO 00/32395 A1 to Chang et al. discloses a polypropylene film containing a non-migratory slip and release additive package of a synthetic or mineral wax, an aluminosilicate additive, and optionally silicone oil and a cross-linked silicone polymer resin to improve cold seal adhesive release properties. Although this patent discloses adding nucleating agents to a polypropylene film for improving the strength of the film, there is no disclosure or suggestion that nucleating agents should or could be added to a polymer composition including a poly-1 butene homopolymer or copolymer composition.

Nucleating agents are known to increase the stiffness of processed materials. Nucleating agents also are known to improve the optical and barrier properties of the resulting materials. Sodium benzoate is a desirable nucleating agent because, for among other reasons, it is readily available and economically practical to use.

However, the use of nucleating agents such as sodium benzoate in the production of biaxially oriented polypropylene films has been considered to be undesirable because, in the amounts typically employed, it creates processing difficulties. U.S. Pat. No. 5,837,177 to DiNardo et al. discloses a method of making a polypropylene product for use in making biaxially oriented films. The method includes the addition of an improved nucleating system that allows for even distribution of a nucleating agent in a polypropylene material. The improved nucleating system comprises a nucleating agent such as sodium benzoate and a liquid miscible with the nucleating agent. The solution is combined with the polypropylene material, and the miscible liquid is removed during processing.

There is a need in the packaging field for an improved cold seal release film exhibiting both a low adhesion to cold seal adhesives, including synthetic adhesives, and improved scuff resistance. It is to such films that the present invention relates.

All references cited herein are incorporated herein by reference in their entireties.

SUMMARY OF THE INVENTION

A cold seal release film constituting either a monolayer film or an outer layer of a multilayer film includes a nucleating agent, such as sodium benzoate, provided in a polymer composition comprising 10%–100% by weight of the polymer composition of a polymer selected from the group consisting of 1-butene homopolymer, ethylene random copolymers of 1-butene including over 50% by weight 1-butene and blends of the 1-butene homopolymer and the ethylene random copolymers of 1-butene, and 90%–0% by weight of the polymer composition of a polymer selected from the group consisting of random copolymers of ethylene and propylene, random copolymers of butene and propylene and random terpolymers of ethylene-butene-propylene, said propylene being over 50% by weight of the polymer composition in said random copolymers of ethylene and propylene and random copolymers of butene and propylene and being the major component by weight of the random terpolymers of ethylene-butene-propylene.

A cold seal release film in accordance with this invention includes a nucleating agent, preferably sodium benzoate, added to a polymer composition comprising 10%–100% by weight of the polymer composition of a polymer selected from the group consisting of 1-butene homopolymer, 1-butene/ethylene random copolymers having over 50% by weight 1-butene and blends of the 1-butene homopolymer and ethylene random copolymers of 1-butene, and 90%–0% by weight of the polymer composition of a polymer selected from the group consisting of random copolymers of ethylene and propylene, random copolymers of butene and propylene and random terpolymers of ethylene-butene-propylene. In the aforementioned film the propylene is over 50% by weight of the polymer composition of the random copolymers of ethylene and propylene and the random copolymers of butene and propylene, and is the major component by weight of the random terpolymer of ethylene-butene-propylene. These films have been determined to have excellent cold seal release from a variety of adhesives, including acrylic/rubber latex adhesives and synthetic adhesives, as well as excellent scuff resistant properties. Most preferably, the cold seal release from the synthetic adhesives is less than 50 grams/inch.

In accordance with this invention the 1-butene/ethylene random copolymers include over 50% by weight of the 1-butene monomer. Most preferably the 1-butene/ethylene random copolymer includes less than 10% by weight of ethylene and more preferably between 0.1% and 6% by weight of ethylene. Representative 1-butene/ethylene random copolymers usable in this invention are Basell DP8220 and Basell PB8340, which are medium ethylene content and low ethylene content 1-butene random copolymers, respectively. In particular, Basell DP8220 includes approximately 2.5% by weight ethylene and Basell PB 8340 includes approximately 0.2% by weight ethylene. It is believed, based upon experience, that the 1-butene homopolymer will perform in this invention the same as the butene random copolymer including 0.2% by weight ethylene. Both of the above-identified 1-butene/ethylene random copolymers are manufactured by Basell Polyolefins of Wilmington Del. 19808.

As noted above, the 1-butene homopolymer and 1-butene/ethylene random copolymers can be employed alone, can be blended together, or each can be employed in combination with other copolymers and terpolymers, including ethylene/propylene random copolymers, propylene/butene random copolymers and propylene/ethylene/butene random terpolymers. The preferred ethylene/propylene random copolymers are predominately propylene monomers, by weight, including up to about 10% by weight ethylene. More preferably the propylene/ethylene random copolymers include less than 6% ethylene, by weight. A representative propylene/ethylene random copolymer usable in this invention is Fina 8573, which includes approximately 5% by weight ethylene monomer in it. Fina 8573 is manufactured by ATO FINA Petrochemicals, LaPorte Tex., 77571.

As noted above, another copolymer that can be employed in combination with either 1-butene homopolymer or a 1-butene/ethylene copolymer is a propylene/butene random copolymer, wherein the propylene is the major component, by weight, of the copolymer. Most preferably the propylene/butene random copolymer includes less than 35% by weight butene and more preferably 3% to 20% by weight butene. A representative propylene/butene random copolymer usable in this invention is Union Carbide DS4DO5, manufactured by DOW Plastics in Houston Tex. 77042. This propylene/butene random copolymer includes approximately 14% by weight butene in it.

A representative propylene/ethylene/butene random terpolymer usable in this invention is Sumitomo SP88. This terpolymer includes approximately 85% by weight polypropylene, based on the weight of the polymer composition of the terpolymer, approximately 12% by weight ethylene based on the weight of the polymer composition of the terpolymer and approximately 3% by weight butene based on the weight of the polymer composition of the terpolymer. This terpolymer is manufactured by Phillips Sumika, Houston Tex. 77058.

The preferred nucleating agent employed in this invention is sodium benzoate; preferably in the range of 0.02–0.1% of the overall polymer blend. It is considered to be within the scope of this invention to employ other nucleating agents. Individuals skilled in the art can test various nucleating agents to determine whether they provide enhanced scuff resistance without adversely affecting the cold seal release properties from the adhesive.

In the context of this invention a nucleating agent is one that has the ability to raise the crystallization temperature of a polyolefin as measured by Differential Scanning Calorimetry (DSC). The quantity of the nucleating agent required to raise the crystallization temperature will vary depending upon the specific nucleating agent that is employed.

In accordance with this invention the cold seal release film can be a monolayer web or film, or an outer layer of a multilayer, coextruded film. In common packaging applications the monolayer or multilayer, coextruded release films are adhered to yet another film, which also can be a monolayer or multilayer film having additional desired properties for specific packaging applications and also receiving a cold seal adhesive on the outer exposed surface thereof. For example, the other film can be a single layer or multilayer white opaque film or a metallized film layer. In these latter applications the surface of the monolayer or multilayer, coextruded release film opposite the release surface, which is the surface to be laminated to the other film, is treated, preferably oxidatively treated by corona or flame treatment, to make it receptive to laminating adhesives and, optionally, to printing inks. Thus, this latter surface optionally can be reverse printed so as to be viewable from the outer side of the release layer and also is capable of receiving a laminating adhesive thereon to bond the monolayer or multilayer s release film to the other film, as described above.

In other applications the monolayer or multilayer, coextruded release film may be used by itself, without being laminated to any other films. In this mode of operation, the surface of the film opposite the surface that is intended to function as the cold seal release surface preferably is treated, preferably oxidatively treated by corona or flame treatment, to make this opposite surface receptive to cold seal adhesives and, optionally, to printing inks.

In accordance with the most preferred embodiments of this invention, the cold seal release film is an outer layer of a composite, multilayer, coextruded film including a central core, an outer release layer including a nucleating agent combined with the earlier-described polymer compositions and a skin layer on the side opposite the release layer. As explained above, the outer surface of this latter outer skin layer is treated, preferably oxidatively treated by corona or flame treatment, to make the surface receptive to printing inks and/or laminating adhesives and/or cold seal adhesives, depending upon whether this outer surface is intended to be reverse printed, laminated to an additional film that will include the cold seal adhesive on the outer exposed surface thereof, or intended to directly receive the cold seal adhesive.

Preferably the skin layer opposite the release layer in the multilayer, coextruded release film is a propylene/ethylene copolymer including less than 10% ethylene, by weight, and more preferably less than 7% ethylene by weight. A preferred propylene/ethylene copolymer employed as the skin layer is Fina 8573, which, as noted earlier in this application, includes approximately 5% by weight ethylene monomer in it.

In a preferred embodiment of this invention the core layer is a polyolefin material, or a blend of polyolefin materials, and most preferably is a polypropylene homopolymer. A representative polypropylene homopolymer employed as the core layer is Fina 3371.

A preferred multilayer construction of this invention is a three-layer structure including a release film or layer having a thickness in the range of 0.25 to 20 microns; preferably 1 micron, a 20-micron-thick core layer and 1-micron-thick skin layer.

It should be understood that the films of this invention may include a variety of additives that are well known to those skilled in the art. For example, antistatic additives, slip additives (e.g., high molecular weight fatty acid amides), organic or inorganic antiblocking additives (e.g., organic polymers such as polyamides, polyesters, polycarbonates and inorganic materials such as silicon dioxide and silicates) and antioxidants may be added to one or more layers of the films of this invention, if desired.

Table 1, infra more specifically describes the construction and composition of seven sample multilayer, coextruded constructions; samples 2, 5 and 6 being within the scope of the present invention. The remaining samples were prepared for comparison purposes.

Table 2, infra shows the cold seal release properties and the scuff resistance properties of the seven samples identified in Table 1. It should be noted that in order to achieve the maximum benefits of this invention, care should be taken to introduce the nucleating agent uniformly throughout the composition. This can best be achieved by grinding the sodium benzoate or other nucleating agent to a very fine particle size, on the order of less than 10 microns. Most preferably the nucleating agent employed in this invention is sodium benzoate having 99.5%, by weight, of a particle size of 10 microns or less.

TABLE 1

Sample Descriptions

| | Release skin composition | Material Description | Core Composition | Material Description | Skin composition |
|---|---|---|---|---|---|
| -1 | Fina 3371 | homopolymer polypropylene | Fina 3371 | homopolymer polypropylene | Fina 8573 |
| -2 | Basell DP8220 0.05% sodium benzoate | medium ethylene content (2.5%) poly-1-butene | Fina 3371 | homopolymer polypropylene | Fina 8573 |
| -3 | Basell DP8220 0.0% sodium benzoate | medium ethylene content (2.5%) poly-1-butene | Fina 3371 | homopolymer polypropylene | Fina 8573 |
| -4 | Fina 3571 0.3% Tospearl T-120 | homopolymer polypropylene crosslinked polydialkyl siloxane (antiblock agent) | Fina 3371 0.05% behenamide fatty acid amide (slip agent) | homopolymer polypropylene | Fina 8573 |
| -5 | 40% Basell DP8220 60% Fina 8573 0.1% sodium benzoate 0.3% Tospearl T-120 | medium ethylene content poly-1-butene ethylene propylene random copolymer crosslinked polydialkyl siloxane | Fina 3371 0.05% behenamide fatty acid amide | homopolymer polypropylene | Fina 8573 |
| -6 | 40% Basell PB8340 60% Union Carbide DS4DO 0.1% sodium benzoate 0.3% Tospearl T-120 | low ethylene (0.2%) poly-1-butene butene propylene random copolymer crosslinked polydialkyl siloxane | Fina 3371 0.05% behenamide fatty acid amide | homopolymer polypropylene | Fina 8573 |
| -7 | 40% Basell DP8220 60% Fina 8573 0.0% sodium benzoate 0.3% Tospearl T-120 | medium ethylene content poly-1-butene ethylene propylene random copolymer crosslinked polydialkyl siloxane | Fina 3371 0.05% behenamide fatty acid amide | homopolymer polypropylene | Fina 8573 | note:
all samples prepared with 1 micron release skin/20 micron core/1 micron print skin

TABLE 2

| Release Skin Polymer or Polymer Blend | Cold Seal Adhesive Release Force g/in 16 hr @ 22 C., 100 psi | | | | Sutherland Rub test | |
|---|---|---|---|---|---|---|
| | ATOfindley 1380 | ATOfindley 7114 | Technical Coatings 339D | Technical Coatings 357D | Initial % Haze | Final % Haze |
| -1 Homopolymer PP | 18 | 30 | 90 | 144 | 1.4 | 1.5* |
| -2 Basell DP8220 + Sodium Benzoate | 10 | 20 | 35 | 54 | 5 | 6.3* |
| -3 Basell DP8220 + NO Sodium Benzoate | 17 | nm | nm | nm | 4.5 | 22.7* |
| -4 Homopolymer PP | 41 | 35 | 73 | 121 | 1.5 | 1.5** |
| -5 40% DP8220 + 60% Fina8573 + Sodium Benzoate | 42 | 30 | 35 | 64 | 1.2 | 1.2** |
| -6 40% PB8340 + 60% DS4D05 + Sodium Benzoate | 38 | 24 | 36 | 63 | 1 | 1.2** |
| -7 40% DP8220 + 60% Fina8573 + NO Sodium Benzoate | 35 | 28 | 38 | 60 | 1.2 | 2.5** |

Notes:
Samples 1–3 prepared on laboratory TMLong Stretcher
Samples 4–7 prepared on pilot tenter line
nm—not measured
*Sutherland Rub test or 50 cycles
**Sutherland Rub test for 10 cycles Film Testing Procedure to Determine the Cold Seal Adhesive Release Force A coating of the specified adhesive was applied via a Mayer rod onto the designated film substrate to provide an adhesive strength greater than 300 g/in. The coating was dried and then the release film was placed against the adhesive. Next, the two films were placed into a blocking jig where a contact force of 100 psi was applied. The samples were held in the jig for 16 hours at 22° C. The force to separate the release film from the adhesive was then measured.

Film Testing Procedure to Determine Scuff Resistance

Two sheets of film with the release surfaces facing each other were mounted on the base and sled of a Sutherland rub tester. The two surfaces were then rubbed for the number of cycles specified in Table 2. The percent of transmission haze was measured before and after the Sutherland rub test, and the difference is the measure of scuff resistance, i.e., the lower the difference the better the scuff resistance.

The invention is illustrated in more detail with reference to the following Examples, but it should be understood that the present invention is not deemed to be limited thereto.

EXAMPLES

The test results reported in Table 2 demonstrate that the addition of a nucleating agent, e.g., sodium benzoate, improves the scuff resistance of the films of this invention, without adversely affecting cold seal release from both acrylic/rubber latex adhesives and synthetic adhesives.

Samples 1 through 3 were produced via a laboratory co-extrusion die and then drawn 7× by 7× at a temperature of 140° C. to effect biaxial orientation. After orientation, the films were heat set 10%. Simultaneously biaxial orientation was carried out on a T.M. Long stretcher (T.M. Long Corporation, Somerville, N.J.).

Samples 4 through 7 were produced by a co-extrusion process on a pilot tenter machine, with the cross-direction orientation step taking place after machine direction orientation, and with the machine direction/cross-machine direction draw ratios being 5× by 10×.

As noted above, samples 1–3 were prepared on the laboratory extruder and T.M. Long stretcher. Samples 1 and 2 were evaluated with one acrylic/rubber latex (ATO findley 1380) and three synthetic adhesives (ATO findley 7114, Technical Coatings 339D and Technical Coatings 357D). The comparative sample 3 was evaluated only with the acrylic/rubber latex.

The ATO findley adhesives are manufactured by ATO Findley, Wauwatosa Wis. 53226. The ATO findley 1380 adhesive is an acrylic/rubber latex adhesive. The ATO findley 7114 adhesive is a synthetic adhesive.

The Technical Coatings adhesives are manufactured by Rohm & Haas, Woodstock Ill. 60098. Both the Technical Coatings 339D adhesive and the Technical Coatings 357D adhesive are synthetic adhesives.

The test results of sample 2 versus sample 1 demonstrate that the 1-butene/ethylene copolymer surface has release properties superior to homopolymer polypropylene for synthetic adhesives, but has an inferior scuff resistance. However, a comparison of sample 2 to comparative sample 3 demonstrates that the scuff resistance of the nucleated polymer (sample 2) is substantially superior to the non-nucleated polymer (comparative sample 3).

Samples 4 through 7 were prepared in a separate set of experiments on a pilot tenter machine, as described earlier herein. In this sample set a polypropylene control, designated sample 4 was compared to nucleated blends of 1-butene/ethylene copolymers with a random copolymer of ethylene and propylene designated sample 5, and with a random copolymer of butene and propylene designated sample 6. Comparative sample 7 is the same polymer blend as sample 5 but with no sodium benzoate nucleator added. Note that due to differences in the manner of producing samples 1 and 4 the absolute values of the adhesive release force are different. However, they still are of the same order of magnitude; demonstrating poor release from synthetic adhesives.

A comparison of sample 4 with samples 5 and 6 again demonstrates that blends containing 1-butene/ethylene copolymers yield superior cold seal release force for synthetic adhesives. Comparison of sample 5 with comparative sample 7 again demonstrates that the addition of sodium benzoate nucleator improves the scuff resistance of the film (note that samples 1 through 3 were run for 50 cycles on the Sutherland rub tester and samples 4 through 7 were run for only 10 cycles).

While the invention has been described in detail with reference to specific examples thereof, it will be apparent to one skilled in the art that various changes and modifications can be made therein without departing from the spirit and scope thereof.

What is claimed is:

1. A packaging structure including a cold seal release film in the form of a monolayer film or an outer layer of a multilayer film, said cold seal release film having an outer surface and comprising a nucleating agent and 10%–100% by weight of the polymer composition of a polymer selected from the group consisting of 1-butene homopolymer, 1-butene/ethylene random copolymers having over 50% by weight 1-butene therein and blends of the 1-butene homopolymer and the 1-butene/ethylene random copolymers, and 90%–0% by weight of the polymer composition of a polymer selected from the group consisting of random copolymers of ethylene and propylene, random copolymers of butene and propylene and random terpolymers of ethylene-butene-propylene, said propylene being over 50% by weight of the polymer composition in said random copolymers of ethylene and propylene and random copolymers of butene and propylene and being the major component by weight of the random terpolymers of ethylene-butene-propylene, and a cold seal adhesive being on an outer surface of the packaging structure opposed to the outer surface of said cold seal release film.

2. The packaging structure of claim 1, wherein 100% of said polymer composition of said cold seal release film is selected from the group consisting of 1-butene homopolymer, 1-butene/ethylene random copolymers having over 50% by weight 1-butene therein and blends of 1-butene homopolymer and the 1-butene/ethylene random copolymers.

3. The packaging structure, of claim 1, wherein 100% of said polymer composition of said cold seal release film is a 1-butene/ethylene random copolymer having over 50% by weight 1-butene therein.

4. The packaging structure of claim 1 wherein the cold seal release film is the outer layer of a multilayer film.

5. The packaging structure of claim 2 wherein the cold seal release film is the outer layer of a multilayer film.

6. The packaging structure of claim 3 wherein the cold seal release film is the outer layer of a multilayer film.

7. The packaging structure of claim 1, wherein the outer surface of said cold seal release film opposed to the outer surface including the cold seal adhesive is a release surface.

* * * * *